United States Patent
Guegan et al.

(10) Patent No.: US 8,868,308 B2
(45) Date of Patent: Oct. 21, 2014

(54) METHOD FOR CONTROLLING THE OPERATION OF A MEANS OF MECHANICALLY COUPLING THE FIRST AND SECOND AXLES OF A MOTOR VEHICLE

(75) Inventors: Stephane Guegan, Versailles (FR); Philippe Saint Loup, Jouars Pontchartrain (FR); Alessandro Monti, La Garenne Colombes (FR); Nicolas Romani, Paris (FR)

(73) Assignee: RENAULT s.a.s, Boulogne-Billancourt (FR)

( * ) Notice: Subject to any disclaimer, the term of this patent is extended or adjusted under 35 U.S.C. 154(b) by 38 days.

(21) Appl. No.: 13/639,965

(22) PCT Filed: Apr. 7, 2011

(86) PCT No.: PCT/FR2011/050792
§ 371 (c)(1),
(2), (4) Date: Dec. 6, 2012

(87) PCT Pub. No.: WO2011/124859
PCT Pub. Date: Oct. 13, 2011

(65) Prior Publication Data
US 2013/0073158 A1 Mar. 21, 2013

(30) Foreign Application Priority Data
Apr. 8, 2010 (FR) .................... 10 52646

(51) Int. Cl.
- *G06F 7/00* (2006.01)
- *G06F 17/00* (2006.01)
- *G06F 19/00* (2011.01)
- *B60K 23/08* (2006.01)

(52) U.S. Cl.
CPC ............. *B60K 23/08* (2013.01); *B60K 23/0808* (2013.01)

USPC ........................................... 701/69

(58) Field of Classification Search
CPC ................................ B60W 2720/263
See application file for complete search history.

(56) References Cited

U.S. PATENT DOCUMENTS

| 2004/0163919 | A1 | 8/2004 | Kirkwood et al. |
| 2004/0222029 | A1* | 11/2004 | Shigeta et al. ............... 180/245 |

(Continued)

FOREIGN PATENT DOCUMENTS

| EP | 1 449 704 | 8/2004 |
| WO | 2007 022210 | 2/2007 |

OTHER PUBLICATIONS

French Search Report Issued Dec. 21, 2010 in FR 10 52646 Filed Apr. 8, 2010.
International Search Report Issued Aug. 19, 2011 in PCT/FR11/50792 Filed Apr. 7, 2011.

*Primary Examiner* — Helal A Algahaim
*Assistant Examiner* — Kelly E Darby
(74) *Attorney, Agent, or Firm* — Oblon, Spivak, McClelland, Maier & Neustadt, L.L.P.

(57) ABSTRACT

A method controlling operation of a mechanism mechanically coupling first and second axles of a transmission system of a motor vehicle, the first axle being driven as standard and the second axle being driven as an option depending on a status of the coupling mechanism, the transmission system being capable of operating in a first mode in which a value of transmittable torque that can be transmitted by the mechanical coupling mechanism is fixed, or in a second mode in which the value of the transmittable torque that can be transmitted by the mechanical coupling mechanism is higher than the value of the transmittable torque for the first mode.

18 Claims, 2 Drawing Sheets

(56) References Cited

U.S. PATENT DOCUMENTS

| | | |
|---|---|---|
| 2005/0079943 A1 | 4/2005 | Kirkwood et al. |
| 2005/0177294 A1* | 8/2005 | Jiang et al. .................. 701/67 |
| 2007/0215428 A1* | 9/2007 | Capito .......................... 192/35 |
| 2010/0243397 A1 | 9/2010 | Capito |

* cited by examiner

METHOD FOR CONTROLLING THE OPERATION OF A MEANS OF MECHANICALLY COUPLING THE FIRST AND SECOND AXLES OF A MOTOR VEHICLE

BACKGROUND OF THE INVENTION

1. Field of the Invention

The present invention concerns a method of operation of a transmission system of the type having four driving wheels of a motor vehicle and a method for controlling a means of mechanically coupling a first axle to a second axle of a transmission system of the type having four driving wheels of a motor vehicle. The invention also concerns a system for controlling the state of the mechanical coupling means. It also concerns a transmission system incorporating such a control system. It furthermore concerns a vehicle incorporating such a control system or such a transmission system.

The invention applies to a vehicle equipped with a system of four guided driving wheels. The objective of this type of vehicle is to improve capability such as performance and safety. In particular, the invention aims to improve the operating reliability of a mechanical coupling means by preventing its deterioration in extreme conditions of utilization, and to improve the traction performance of the vehicle equipped with the transmission system.

2. Description of Related Art

A transmission of the type having four driving wheels is known, in which a mechanical means of coupling a front axle to a rear axle (coupler) can operate according to three states defining three operating modes of the transmission system.

- a first transmission mode where only a (variable) portion of the maximum torque capacity originating from a torque source (the engine of the motor vehicle) and intended for the rear axle is effectively transmitted to the rear axle; this first mode called "AWD Auto" mode corresponding to a coupler said to be "guided", that is to say that a system for controlling the coupler automatically manages its operation, in particular the amount of torque transmitted or transmittable,
- a second transmission mode where the totality of the maximum torque capacity originating from the torque source and intended for the rear axle is effectively transmitted to the rear axle; this second mode called "4WD Lock" mode corresponding to a coupler said to be "closed", that is to say that it is locked in a state defining a fixed value of maximum transmittable torque,
- a third transmission mode where no torque (or negligible torque) originating from the torque source is transmitted to the rear axle; this third mode called "2WD" mode corresponding to a coupler said to be "open", that is to say that the coupler is deactivated or that it transmits only a negligible amount of torque.

Document US 2003/098193 describes a method for distributing torque between the front and rear axles of a vehicle depending on the difference between the speeds of rotation of the front and rear axles. This method allows vehicle performance to be improved by optimizing slip without defining any compromise between reliability and performance.

U.S. Pat. No. 5,247,443 describes a method for distributing torque between the front and rear axles of a vehicle depending on the difference between the speeds of rotation of the front and rear axles, and which changes the detection threshold on slip if the vehicle service brake has been actuated. This method allows vehicle performance to be improved by optimizing slip without defining any compromise between reliability and performance.

The aim of the invention is to provide a method for controlling a means of mechanically coupling axles enabling the aforementioned problems to be remedied and improving the control methods known from the prior art. In particular, the invention proposes a method for controlling mechanical coupling means enabling the operating reliability of a means of coupling the axles of a motor vehicle of the type having four driving wheels to be improved while retaining good obstacle clearance performance.

BRIEF SUMMARY OF THE INVENTION

According to the invention, the method controls the operation of a means of mechanically coupling the first and second axles of a transmission system of a motor vehicle. The first axle is driven as standard and the second axle is driven as an option depending on the state of the coupling means. The transmission system is capable of operating in a first mode in which the value of the torque that can be transmitted by the mechanical coupling means is fixed, or in a second mode in which the value of the torque that can be transmitted by the mechanical coupling means is higher than the value of the transmittable torque in the first mode.

The transmission system can be capable of operating in a third mode in which the value of the transmittable torque is variable and lower than the value of the transmittable torque in the first mode.

The transmission system can be capable of operating in a fourth mode in which the value of the transmittable torque is zero or negligible.

The transmission system can enter the second operating mode when the following conditions exist together:
- the required torque value is equal to the value of the transmittable torque in the first mode, and
- the temperature, for example estimated or measured, of the mechanical coupling means is higher than a first temperature threshold, and
- the difference in speed of the wheels of the first and second axles is higher than a first threshold, and
- the speed of the vehicle is lower than a first speed threshold.

The transmission system can enter the second operating mode when the following conditions exist together:
- the required torque value is equal to the value of the transmittable torque in the first mode, and
- the difference in speed of the wheels of the first and second axles is higher than a first threshold, and
- the speed of the vehicle is lower than a first speed threshold.

The transmission system can exit the second operating mode when the following conditions exist together:
- the difference in speed of the wheels of the first and second axles is lower than a second threshold, or the speed of the vehicle is higher than a second speed threshold, and
- the first or the third mode is required.

In the second mode, the value of the torque that can be transmitted by the mechanical coupling means can be fixed.

In the second mode, the value of the torque that can be transmitted by the mechanical coupling means can be variable.

In the second mode, the value of the torque that can be transmitted by the mechanical coupling means can be dependent upon the difference in speed of the wheels of the first and second axles, for example, it can be an affine function of the difference in speed of the wheels of the first and second axles.

According to the invention, the method controls the operation of a transmission system of a motor vehicle. The system includes a first axle driven as standard and a second axle driven as an option depending on the state of a means of mechanically coupling the first and second axles. The operating method includes an implementation phase of the control method defined above.

The invention also relates to a data recording medium that can be read by a computer on which a computer program is recorded, which contains computer program code means for implementing the steps of the method defined above.

According to the invention, the system controls the state of a means of mechanically coupling the first and second axles of a transmission system of a motor vehicle. The first axle is driven as standard and the second axle is driven as an option depending on the state of the coupling means. The system includes hardware and/or software means of implementing the method described above.

The hardware means can include:
  a means of determining the torque required on the second axle,
  optionally, a means of determining the temperature of the mechanical coupling means,
  a means of determining the difference in speed of the wheels of the first and second axles, and
  a means of determining the speed of the vehicle.

According to the invention, the transmission system of a motor vehicle includes a first axle driven as standard and a second axle driven as an option depending on the state of a means of mechanically coupling the first and second axles and a system for controlling the mechanical coupling means defined above.

According to the invention, the motor vehicle includes a control system defined above or a transmission system defined above.

The invention also relates to a computer program including a computer program code means suitable for implementing the steps of the method defined above when the program runs on a computer.

BRIEF DESCRIPTION OF THE DRAWINGS

The attached drawings illustrate, as an example, a method for executing a control method according to the invention and an embodiment of a control system according to the invention.

DETAILED DESCRIPTION

Figure 1:
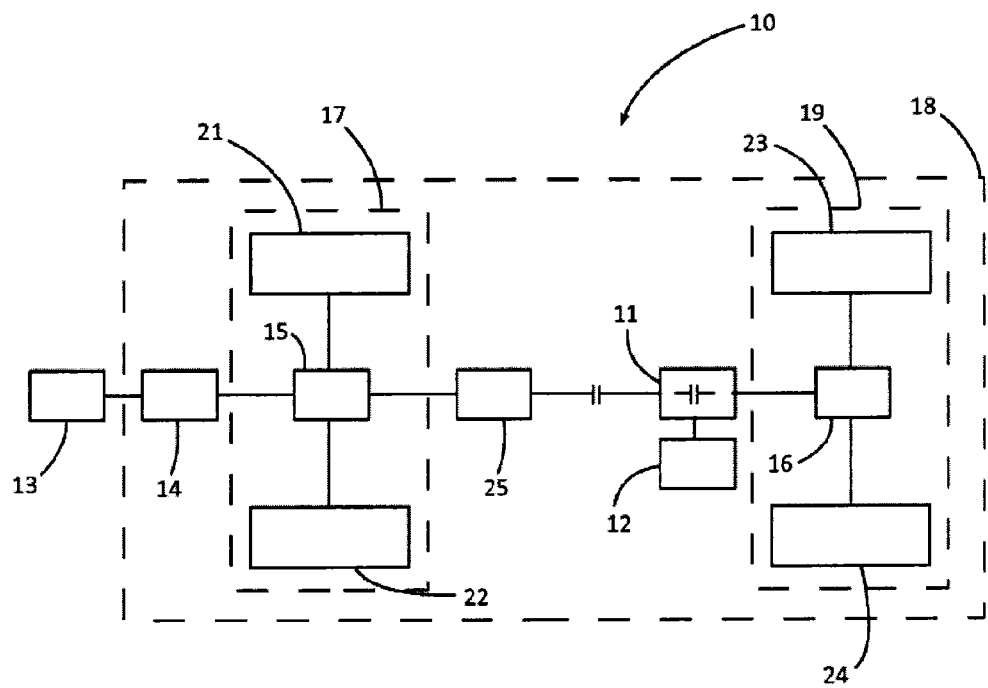
FIG. 1 is an embodiment of a motor vehicle including a transmission system with four driving wheels according to the invention.

An embodiment of motor vehicle 10 according to the invention illustrated in FIG. 1 includes an embodiment of a transmission system 18 of the type having four driving wheels, and in particular, of the type having four steered driving wheels.

The transmission system 18 is mechanically linked to an engine 13 (or torque source) driving the vehicle. The transmission system 18 principally includes a first axle 17 of wheels 21, 22 which are connected by a differential 15 which is itself connected to the engine 13 via a gearbox 14 and a second axle 19 of wheels 23, which are connected by a differential 16, the differential 16 being connected to the differential 15 via a transfer case 25 and a mechanical coupling means (coupler) 11. The transmission system also includes a control system 12 for controlling the state of the mechanical coupling means. The control system includes a means of selecting the operating mode of the transmission system and a computer.

Although they are not illustrated, the transmission system includes means of determining variables of vehicle state, such as for example, means of obtaining the speed of rotation of each wheel, means of obtaining information relative to braking (detector of action on a brake pedal, detector of action on a parking brake control unit, detectors of activation of a system for controlling the stability and/or the traction and/or the grip of the vehicle) and electronic or automatic calculation means. The transmission system incorporates a means of selection by the user (for example on the dashboard) of an operating mode for the system, in particular a first mode "AWD Auto", a second mode "4WD Lock" or a third mode "2WD", a means of detecting, based on the variables of vehicle and/or system state, the driver's wishes and the driving conditions (acceleration, braking, skidding etc.) and a control means for switching the system to a determined mode according to the mode selected by the driver, the driver's wishes and the vehicle's driving conditions. The transmission system, in particular the system controlling the coupling means, also includes all of the hardware and/or software means, enabling the implementation of the methods that are the subjects of the invention. In particular, the systems, especially the computer, can include a computer program containing a computer program code means suitable for implementing the steps of the methods that are the subjects of the invention.

In the transmission system, the first axle (for example, the front axle, respectively the rear axle) is driven as standard by the torque source. By contrast, the second axle (for example, the rear axle, respectively the front axle) is only driven as an option according to the state of the coupler.

In this respect, depending on the coupler state, the transmission system offers the following four operating modes:
  a first transmission mode where only a (variable) portion of the maximum torque capacity originating from the torque source and intended for the second axle is effectively transmitted to the second axle; this first mode called "AWD Auto mode" corresponding to a coupler said to be "guided", that is to say that the system for controlling the coupler automatically manages its operation, in particular the amount of torque transmitted or transmittable,
  a second transmission mode where the totality CLock of the maximum torque capacity originating from the torque source and intended for the second axle is effectively transmitted to the second axle; this second mode called "4WD Lock mode" corresponding to a coupler said to be "closed", that is to say that it is locked in a state defining a fixed value of maximum transmittable torque CLock, a third transmission mode where no torque or only negligible torque originating from the torque source is transmitted to the second axle; this third mode called "2WD mode" corresponding to a coupler said to be "open", that is to say that the coupler is deactivated or that it transmits only a negligible amount of torque, a fourth transmission mode where more than the totality CLock of the maximum torque capacity originating from the torque source and intended for the second axle is effectively transmitted to the second axle; this fourth mode called "4WD SuperLock mode" corresponding to a coupler said to be "closed", that is to say that it is locked in a state defining a fixed or variable value CSuperLock of transmittable torque, the value CSuperLock being higher than that of torque CLock.

In technological terms, the coupler can be of the friction type, that is to say that it incorporates friction discs designed to come into contact with each other to transmit the torque, and an actuator means for separating or bringing its discs into contact with each other. The actuator means is controlled by the control system 12. The coupler is, for example, of the electromagnetic clutch type controlled by current.

The management of the torque transferred by the coupler must avoid placing too much strain on the mechanical elements of the transmission system, for fear of risking mechanical failure. A compromise must therefore be contrived between obstacle clearance efficiency (necessitating punctual vigorous torque transfers) and reliability of the mechanical elements (put at risk by frequently applied high torque values).

In the case of a clutch type of coupler, where the latter spins (slips), there is friction, and consequently, the clutch heats up. The friction is created by the difference in speed between the inlet and the outlet of the coupler, corresponding to the transmissions moving to the front and rear axles.

The methods and systems according to the invention allow the delivery of a torque CSuperLock greater than the maximum torque CLock usually authorized in the "4WD Lock" mode when certain conditions exist together in "4WD Lock" mode or "AWD Auto" mode. A transition then takes place from the "4WD Lock" mode or "AWD Auto" mode to the "4WD SuperLock" mode. This higher torque can allow the clutch to stop slipping and therefore no longer to heat up.

Figure 2:
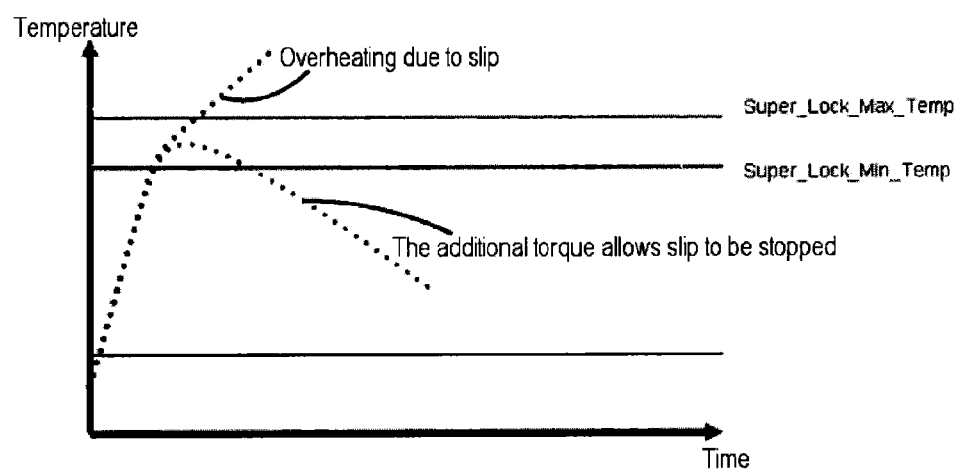
FIG. 2 is a graph illustrating the effect of the invention on a means of mechanically coupling the axles of a vehicle with four driving wheels.

This test is described below with reference to FIG. 2. This figure illustrates variations in coupler temperature over time. For example, the vehicle is assumed to be in an obstacle clearance phase in which the transmission system operates in "4WD Lock" mode or "AWD Auto" mode. On account of the difficulty of clearing the obstacle, the speeds of the front and rear axles are different and slip occurs between the friction discs in the coupler. This friction causes the coupler to heat up, illustrated by a rising portion of the coupler temperature curve in FIG. 2. If nothing is done, the temperature can continue to rise as shown by the portion of the curve marked "overheating due to slip". On the contrary, thanks to the invention, the transmission system can pass to the "4WD SuperLock" mode where slip is eliminated. In this way, the coupler temperature reduces as shown by the portion of the curve marked "the additional torque allows slip to be stopped".

A return is made to the "4WD Lock" mode or "AWD Auto" mode after certain conditions have returned to nominal values. The conditions for transition between the "4WD Lock" mode or "AWD Auto" mode and the "4WD SuperLock" mode can differ.

The transition to the "4WD SuperLock" mode can, for example, be controlled by mapping as a function of the vehicle's speed.

In the "4WD SuperLock" mode, one can use saturation, for example, by way of mapping, acting as a gage in order to ensure that the torque applied to the coupler 11 does not in any way exceed the limits fixed by the torque strategies.

The methods and systems according to the invention enable more torque to be applied in the event of coupler slip and/or heating in order to attempt to stop the slip. This application of additional torque can be based on a mapping process determining the value of the torque to be applied. The torque to be applied can subsequently be filtered in order to construct a gage and/or a saturation.

The invention enables the application or control of a torque beyond the usual maximum limit torque in the "4WD Lock" and "4WD Auto" traction modes.

The invention authorizes the punctual obstacle clearance of significant obstacles (steep slopes, for example) by authorizing significant torque transfers between the axles.

The invention enables coupler heating to be reduced.

The invention enables occurrences of high transferred torque values to be reduced, and hence the life of the mechanical elements to be extended.

It furthermore allows the torque sent to the actuator to be saturated and filtered. It is applicable to vehicles whose front axle is driven as standard as well as to vehicles whose rear axle is driven as standard.

The methods according to the invention are integrated into general operating methods controlling the transitions among the different operating modes of the transmission system according to the invention.

The transitions between the modes "2WD", "AWD Auto" and "4WD Lock" are directly controlled by the driver, for example via a manual selector button. The distribution of torque in the "AWD Auto" mode is performed according to the demand defined by the driving conditions. The transition from the "AWD Auto" mode to the "2WD" mode or the "4WD Lock" mode can be made after detecting a malfunction.

The transmittable torque in the fourth "4WD SuperLock" mode is greater than the transmittable torque in the "4WD Lock" mode.

In grading CSuperLock, CLock, CAuto and C2WD, the torques transmittable by the coupler respectively in the modes "4WD SuperLock", "4WD Lock", "AWD Auto" and "2WD", we can write the following inequality: CSuperLock>CLock≥CAuto≥C2WD.

For example, the different torque values can lie within the following ranges:

| CSuperLock | CLock | CAuto | C2WD |
|---|---|---|---|
| 1000 Nm-1500 Nm | 1000 Nm | 0 Nm-1000 Nm | 0 Nm-100 Nm |

With the aim of limiting and stopping clutch slip, the torque CSuperLock is applied, which is greater than the usual maximum torque. This torque must not be used too frequently, as it places high strains on the transmission system. This function is only used when the traction modes 4WD Lock and/or AWD Auto are activated and when certain conditions are encountered. These conditions can result from a critical situation where the clutch is at its overheating limit.

Figure 3:
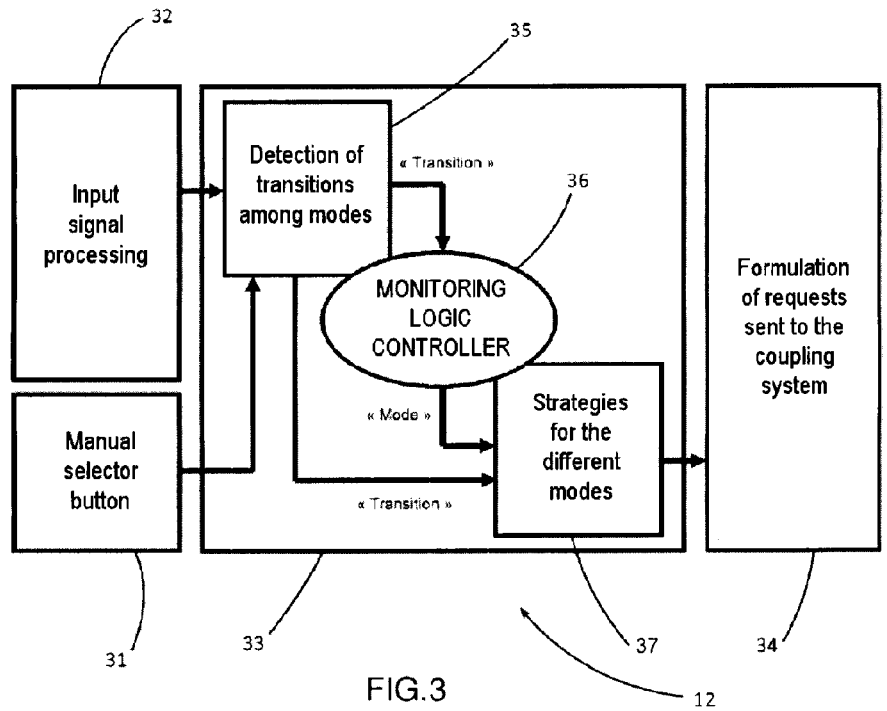
FIG. 3 is a diagram of a software architecture governing the operation of a control system and of a transmission system according to the invention and enabling the methods according to the invention to be implemented.

An example of a software architecture of the control system 12 enabling implementation of the invention is shown in FIG. 3. It includes a module 31 for acquiring the position of an operating mode selector button, a module 32 for acquiring input signals coming from different units and sensors of the vehicle, a module 33 for processing these acquisitions and a module 34 for formulating commands to send to the coupler 11. The module 33 includes a sub-module 35 for detecting operating mode transitions, a sub-module 37 for defining strategies relating to the different operating modes and a monitoring logic controller 36.

A first example of an execution mode of a control method according to the invention is described below.

Changing to the "4WD SuperLock" mode is only possible from the modes "4WD Lock" or "AWD Auto". It is not possible from the mode "2WD".

In order to change from the "4WD Lock" mode to the "4WD SuperLock" mode, all of the following conditions must exist together:

Requested torque=CLock, and

Coupler temperature (estimated or measured)≥first temperature threshold (heating warning temperature threshold) $T_1$, and Slip (mean of the front wheel speeds−mean of the rear wheel speeds)≥a first threshold value (inter-axle slip threshold) $G_1$ (of the order of 5km/h, for example), anc. Vehicle speed<a first threshold (speed low threshold) $V0$ (of the order of 20km/h, for example).

One thus changes to the "4WD SuperLock" mode only if the maximum authorized torque in "4WD Lock" mode proves to be insufficient to overcome the obstacle (which causes coupler heating and sustained slip between the front and rear axles), and if this has been for a sufficient time for the coupler temperature to have risen above the heating warning temperature threshold Ti.

In order to change from the "4WD SuperLock" mode to the "4WD Lock" mode, the following conditions must exist together:

Coupler temperature (estimated or measured)<second temperature threshold (normal operating temperature threshold) $T_0$ OR Vehicle speed>second speed threshold (speed moderate threshold) $V1$ (of the order of 40 km/h, for example), and "4WD Lock" mode requested (for example, by the driver via the selector button).

In order to change from the "4WD SuperLock" mode to the "AWD Auto" mode, the following conditions must exist together:

Coupler temperature (estimated or measured)<second temperature threshold (normal operating temperature threshold) $T_0$ OR Vehicle speed>second speed threshold (speed moderate threshold) $V1$ (of the order of 40 km/h, for example), and "AWD Auto" mode requested (for example, by the driver via the selector button).

The temperature thresholds $T_0$ and $T_1$ are such that $T_0 < T_1$. For example: $T_0 = 120°C$ and $T_1 = 140°C$. Exit from the mode "4WD SuperLock" is therefore authorized when the coupler temperature has been controlled (which assumes that slip has been controlled) or if the vehicle speed becomes too high to authorize vigorous couplings.

A second example of an execution mode of a control method according to the invention is described below.

In this variant, the change to the mode "4WD SuperLock" is no longer conditioned by temperature, but only by slip. This allows any torque surplus to be exploited more rapidly. The effect on obstacle clearance performance is positive but occurrences of utilization of the mode "4WD SuperLock" are more numerous.

In order to change from the mode "4WD Lock" to the mode "4WD SuperLock", all of the following conditions must exist together:

Requested torque=CLock, and

Slip (mean of the front wheel speeds−mean of the rear wheel speeds)≥a first threshold value (inter-axle slip threshold) $G_1$ (of the order of 5 km/h, for example), and Vehicle speed<a first threshold (speed low threshold) $V0$ (of the order of 20 km/h, for example).

In order to change from the mode "4WD SuperLock" to the mode "4WD Lock", the following conditions must exist together:

Coupler slip<$G_0$ where $G_0 = 0.5*G_1$ OR Vehicle speed>second speed threshold (speed moderate threshold) $V1$ (of the order of 40km/h, for example) "4WD Lock" mode requested (for example, by the driver via the selector button).

In order to change from the mode "4WD SuperLock" to the mode "AWD Auto", the following conditions must exist together:

Coupler slip<$0.5*G_1$ OR Vehicle speed>second speed threshold (speed moderate threshold) $V1$ (of the order of 40km/h, for example), and "AWD Auto" mode requested (for example, by the driver via the selector button).

In a first variant of the control method, the transmittable torque in mode "4WD SuperLock" is constant and takes its maximum value, for example, 1500 Nm. Thus, the method is simple to implement and rapidly makes the transmission system effective in obstacle clearance operations.

In a second variant of the control method, the transmittable torque in mode "4WD SuperLock" is variable and its minimum is CLock (1000 Nm in our example) and its maximum is CSuperLock (1500 Nm in our example). Between these two values, the variation depends on the slip between front and rear wheels.

This variation dependent upon slip can adopt the following form:
CSuperLock=CLock+axSlip (with saturation at 1500 Nm) a being a positive constant to be determined during vehicle tests.

This second variant is preferably, but not necessarily, associated with the second execution mode of the method.

This second variant allows occurrences of high coupling torques to be limited (1500 Nm). In fact, only cases where such a coupling torque is really necessary (slip always present if coupling torque is less) give rise to this maximum coupling torque. This allows, in particular, some release from the inaccuracies of the coupler. For example, a coupler that would allow 1800 Nm to be transmitted when it is asked to transmit 1500 Nm would never or almost never achieve its maximum torque. In fact, it is highly improbable that 1500 Nm actually transferred would not be sufficient to reduce slip. Thus, the torque CSuperLock=CLock+axSlip does not reach 1500 Nm and the torque actually transferred does not reach 1800 Nm.

The value of this second variant, therefore, is that it further limits the occurrences of utilization of high coupling torques. It is all the more beneficial due to the fact that the couplers are inaccurate in obtaining the requested transfer torque.

Figure 4:
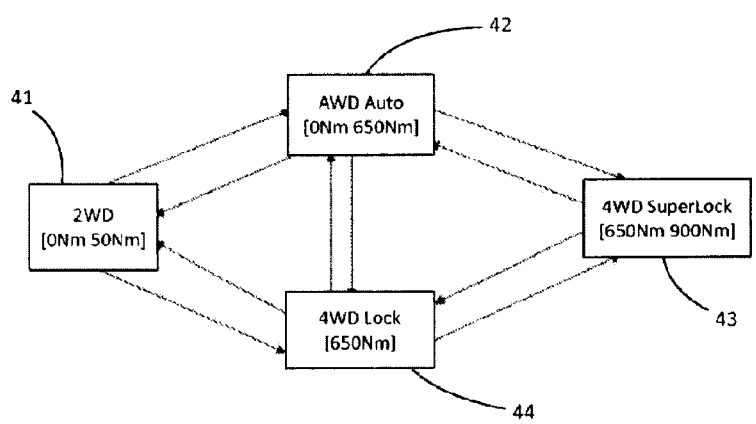
FIG. 4 is a diagram of the different modes in which the transmission system according to the invention can operate; this diagram also illustrates the possible transitions among these different modes.

FIG. 4 illustrates the different operating modes of the transmission system and the possible transitions among these different modes. The mode "2WD" is represented by a rectangle 41, the mode "AWD Auto" is represented by a rectangle 42, the mode "4WD SuperLock" is represented by a rectangle 43 and the mode "4WD Lock" is represented by a rectangle 44. It is possible to change from one to any one of the others of the following three modes "2WD", "AWD Auto" and "4WD Lock". By contrast, the mode "4WD SuperLock" can only be reached from the modes "AWD Auto" and "4WD Lock".

The invention claimed is:

1. A method for controlling an operation of a coupling means mechanically coupling first and second axles of a transmission system of a motor vehicle, the first axle being driven as standard and the second axle being driven as an option depending on a state of the coupling means, the transmission system being capable of operating in a first mode in which a first maximum value of torque can be transmitted by the mechanical coupling means, or in a second mode in which a second value of torque that can be transmitted by the mechanical coupling means is higher than the first maximum value of torque transmittable in the first mode, the method comprising:
operating, by a control system, the transmission system in the first mode, and while operating the transmission system in the first mode,
determining a required torque value,
determining a first difference in speed of wheels of the first and second axles, and
determining a first speed of the vehicle; and
changing, automatically by the control system, an operating mode of the transmission system from the first mode to the second mode when the following conditions exist together:
the required torque value is equal to the first maximum value of torque transmittable in the first mode,
the first difference in speed of wheels of the first and second axles is higher than a first threshold, and
the first speed of the vehicle is lower than a first speed threshold.

2. The control method as claimed in claim 1, further comprising, while operating the transmission system in the first mode, varying a value of the transmittable torque within a range of values lower than or equal to the first maximum value of torque that can be transmitted in the first mode.

3. The control method as claimed in claim 1, further comprising operating the transmission system in a third mode in which the value of the transmittable torque is zero or negligible.

4. The control method as claimed in claim 1, further comprising:
while operating the transmission in the first mode, determining a temperature, estimated or measured, of the mechanical coupling means; and
changing the operating mode of the transmission system to the second operating mode when the following conditions exist together:
the required torque value is equal to the first maximum value of torque that can be transmitted in the first mode,
the temperature, estimated or measured, of the mechanical coupling means is higher than a first temperature threshold,
the first difference in speed of wheels of the first and second axles is higher than a first threshold, and
the first speed of the vehicle is lower than a first speed threshold.

5. The control method as claimed in claim 1, further comprising:
operating the transmission system in the second mode, and while operating the transmission system in the second mode,
determining a second difference in speed of wheels of the first and second axles,
determining a second speed of the vehicle, and
determining a required mode; and
changing the operating mode of the transmission system from the second operating mode to the first operating mode when the following conditions exist together:
the second difference in speed of wheels of the first and second axles is lower than a second threshold, or the second speed of the vehicle is higher than a second speed threshold, and
the first mode is required.

6. The control method as claimed in claim 1, wherein in the second mode, the second value of torque that can be transmitted by the mechanical coupling means is fixed.

7. The control method as claimed in claim 1, wherein, in the second mode, the second value of torque that can be transmitted by the mechanical coupling means is variable.

8. The control method as claimed in claim 7, wherein, in the second mode, the second value of torque that can be transmitted by the mechanical coupling means is dependent upon a difference in speed of wheels of the first and second axles, or is an affine function of a difference in speed of wheels of the first and second axles.

9. An operating method of a transmission system of a motor vehicle, the system including a first axle driven as standard and a second axle driven as an option depending on a state of a means of mechanically coupling the first and second axles, the operating method comprising:
an implementation phase of the control method as claimed in claim 1.

10. A non-transitory data recording medium that can be read by a computer on which a computer program is recorded, including computer program code means for implementing the method as claimed in claim 1.

11. A system for controlling a state of a means of mechanically coupling first and second axles of a transmission system of a motor vehicle, the first axle being driven as standard and the second axle being driven as an option depending on the state of the coupling means, the system comprising:
means for determining a torque required on the second axle;
means for determining a difference in speed of wheels of the first and second axles;
means for determining a speed of the motor vehicle;
means for automatically changing an operating mode of the system to vary an amount of torque available to the second axle via the mechanical coupling means based on the torque required on the second axle, the difference in speed of wheels of the first and second axles, and the speed of the vehicle.

12. The control system as claimed in claim 11, further including:
means for determining a temperature of the mechanical coupling means.

13. A transmission system of a motor vehicle, including a first axle driven as standard and a second axle driven as an option depending on a state of a means of mechanically coupling the first and second axles and a system for controlling the mechanical coupling means as claimed in claim 11.

14. A motor vehicle including a control system as claimed in claim 11.

15. The control system as claimed in claim 11, wherein the means for determining a torque required on the second axle includes one or more of
means for selecting an operating mode of the transmission;
a detector of action on a brake pedal;
a detector of action on a parking brake control unit;
a detector of activation of a system for controlling vehicle stability;
a detector of activation of a system for controlling traction;

a detector of activation of a system for controlling grip; or a software module for acquiring input signals coming from different units and sensors of the vehicle.

16. The control system as claimed in claim 11, wherein the means for automatically changing an operating mode of the system to vary an amount of torque available to the second axle via the mechanical coupling means based on the torque required on the second axle, the difference in speed of wheels of the first and second axles, and the speed of the vehicle includes a mapping process determining the value of the torque to be applied.

17. The control system as claimed in claim 11, wherein the means for automatically changing an operating mode of the system to vary an amount of torque available to the second axle via the mechanical coupling means based on the torque required on the second axle, the difference in speed of wheels of the first and second axles, and the speed of the vehicle includes one or more of a gage or a saturation.

18. The transmission system as claimed in claim 13, wherein the means of mechanically coupling the first and second axles includes an actuator of an electromagnetic clutch type.

* * * * *